June 15, 1954   W. H. WANNAMAKER, JR   2,681,431
REBALANCEABLE ALTERNATING CURRENT
BRIDGE FOR FREQUENCY MEASUREMENT
Filed May 9, 1951
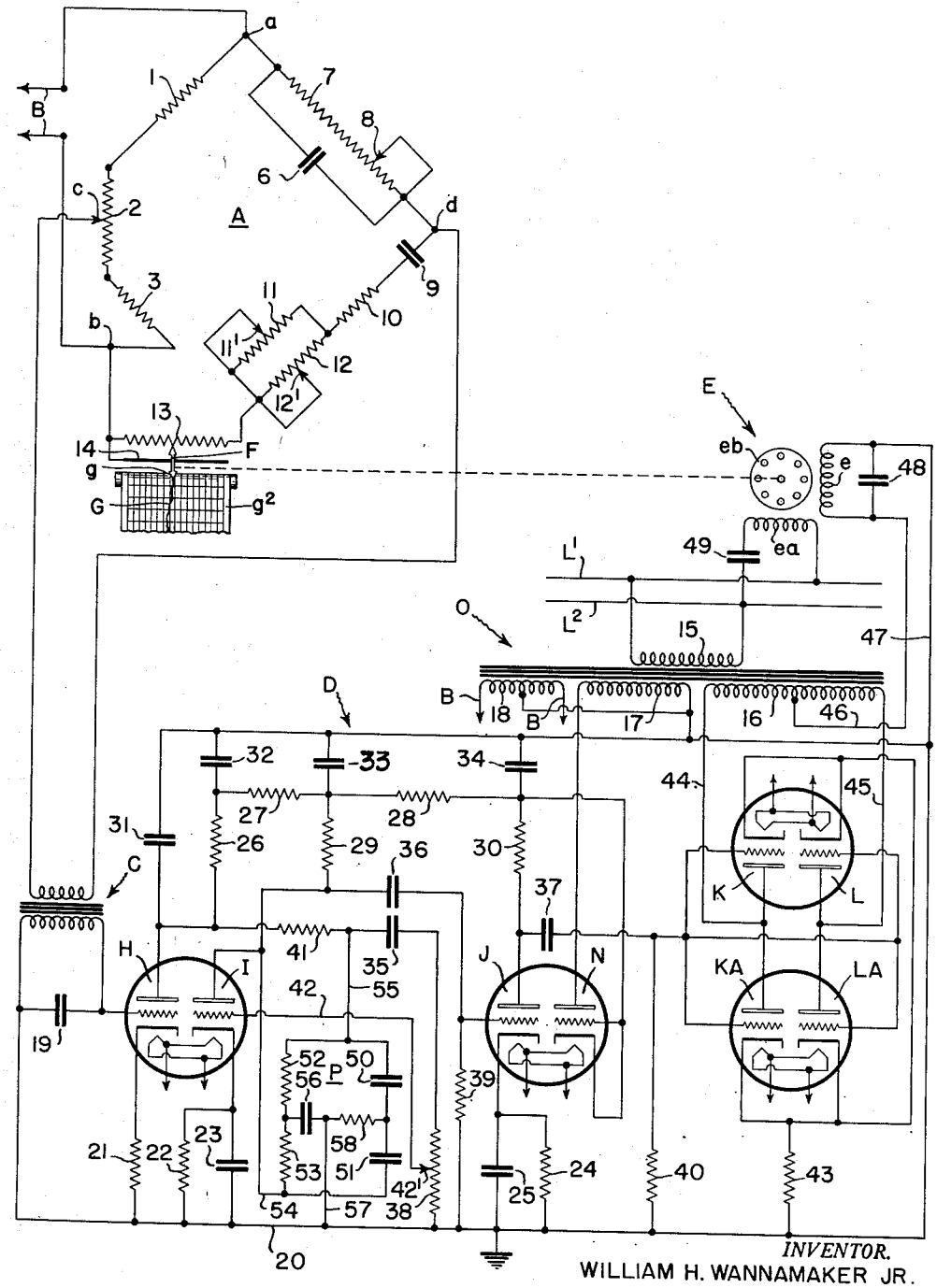
INVENTOR.
WILLIAM H. WANNAMAKER JR.
BY Arthur H. Swanson
ATTORNEY.

Patented June 15, 1954

2,681,431

UNITED STATES PATENT OFFICE 2,681,431

REBALANCEABLE ALTERNATING-CURRENT BRIDGE FOR FREQUENCY MEASUREMENT

William H. Wannamaker, Jr., Philadelphia, Pa., assignor to Minneapolis-Honeywell Regulator Company, Minneapolis, Minn., a corporation of Delaware Application May 9, 1951, Serial No. 225,401

3 Claims. (Cl. 318—29)

The general object of the present invention is to provide a simple and effective automatic frequency measuring and recording device, operating to continuously balance, measure and record the frequency of an alternating current of conventional power circuit frequency range of variation, of 58 to 62, or of 59 to 61 cycles per second, and a voltage range of 110 to 125 volts. The invention has a large field of use in central stations and other places where accurate recording is required.

Heretofore, the only automatic frequency recording meter in use or available for use in central stations, in this country, or elsewhere, insofar as I am aware, is of the intermittent balancing type disclosed in the Wunsch Patents 1,751,538 and 1,751,539 of March 25, 1930. In those patents a galvanometer pointer, deflecting in response to variations in the frequency being measured, cooperates with a cyclic operating power mechanism to adjust a measuring circuit when unbalance is indicated by the galvanometer deflection. Each rebalancing actuation of the power mechanism also effects a corresponding adjustment of a recording element.

In central power stations and load dispatching offices, which constitute major fields of use for a frequency recording instrument, it is highly desirable that the frequency measurements be made continuously and accurately, so that the direction and rate of any frequency deviation may be promptly detected, and the proper compensating or corrective action may be taken without delay. The apparatus disclosed herein is the first practically operative for prompt continuous detection and corrective actions.

A specific object of the invention is to provide frequency recording apparatus comprising a measuring circuit including an alternating current impedance bridge having input terminals connected to a source of alternating current of the frequency to be measured, and including a rheostatic resistance and an alternating current motor operating in instantaneous response to a variation in the frequency being measured to effect the appropriate rebalancing adjustment of said rheostatic resistance, and thereby maintain the measuring circuit in balance substantially continuously.

Another practically important object of the invention is to combine the measuring circuit just described with an electronic voltage and motor drive amplifier unit for operating a reversible two phase rebalancing motor in accordance with the magnitude and direction of any change in the frequency being measured. The fact that the amplifier unit and the rebalancing motor which it controls may be of a well known commercially available type, constitutes a practically important advantage of the invention. A further advantage of the invention arises from the fact that the source of alternating current which is to have its frequency measured, may be employed to energize the amplifier unit, so that the measuring and recording instrument requires but a single connection to a source of alternating current to energize the frequency measuring bridge circuit and to energize the voltage and motor drive amplifier unit. With the measuring bridge circuit and amplifier unit so energized, ordinary variations in the source voltage do not result in significant errors.

Another specific object of the invention is to provide a frequency measuring, self-balancing bridge circuit of the Wien type, having circuit elements of such value and range, that the rebalancing actions may be effected with suitable rapidity and accuracy by the adjustment of a single rheostatic resistance in one arm of the bridge circuit. A further object of the invention is to combine the measuring bridge circuit with an amplifier unit including provisions for minimizing the amplfier blocking action of stray currents and harmonics.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

The embodiment of the invention shown in the drawing comprises a frequency measuring bridge circuit A having input terminals $a$ and $b$ and output terminals $c$ and $d$. The input terminals $a$ and $b$ are connected by terminal conductors B to a source of alternating current the frequency of which is to be measured, and the output terminals $c$ and $d$ are coupled by a transformer C to the input terminals of an electronic voltage and motor drive amplifier unit D. The output terminals of said unit are connected to the terminals of the control winding $e$ of a reversible two phase motor E. The latter also comprises a power winding $ea$ which cooperates with the control winding $e$ to rotate the rotor $eb$ of the motor E and adjust a rheostatic element F in the direction and to the extent required to rebalance the circuit A when the latter is unbalanced on a change in the frequency measured. As shown, a pen $g$ or other marking element is attached to the element F and arranged, as diagrammatically shown, to trace a record G of the varying value of the frequency measured on a travelling record strip $g^2$.

The measuring bridge circuit A is of the so-called self-balancing Wien type, comprising first and second ratio resistance arms and first and second comparison arms. Each ratio resistance arm has one end connected to one end of the other at the bridge junction or terminal $c$. The first ratio resistance arm includes a fixed resistance 1 and an adjustable portion of a slide wire resistor 2, and has its second end connected to one end of the first comparison arm at the bridge junction point or terminal $a$. The second ratio resistance arm includes the adjustable portion of the resistor 2 not included in the first ratio resistance arm, and includes a fixed resistor 3. The second end of the second ratio resistance arm is connected to the second comparison arm of the bridge at the bridge junction point or terminal $b$.

The first comparison bridge arm is connected between the bridge junctions or terminals $a$ and $d$, and includes a capacitor 6 and a resistor 7 in parallel therewith. The portion of the resistor 7 operatively included in the bridge circuit may be varied by adjustment of a short circuiting slider contact 8 along the resistor 7. The second comparison arm of the bridge includes a capacitor 9, a normally fixed resistance comprising resistors 10, 11, and 12, and a variable resistance 13, all connected in the order stated between the bridge junctions or terminals $d$ and $b$. As shown the portions of the resistors 11 and 12 operatively connected in the bridge circuit may be adjusted by moving short circuiting contacts 11' and 12' along said resistors.

As shown, the bridge junction point $c$ is in the form of a slider contact adjustable along the resistor 2. The adjustment of the contact $c$ is a manually effected calibrating adjustment, as are each of the previously mentioned adjustments to the contacts 8, 11' and 12'. The previously mentioned element F is a bridging contact in sliding or wiping engagement with the resistor 13 and with a short circuiting conductor 14 alongside of the resistor 13. The conductor 14 has one end connected to the end of the resistor 13 connected to the bridge junction $b$. The adjustment of the element F along the resistor 13 and conductor 14 is not a calibrating adjustment, but is a rebalancing adjustment automatically effected by the motor E whenever needed to rebalance the bridge A.

In the balanced condition of the circuit A in which the frequency of the current source connected to the bridge terminals B is at its normal value, the impedances of the ratio bridge arms and of the bridge arms including the condensers 6 and 9, are so related, or balanced, that there is no voltage difference between the bridge terminals $c$ and $d$. When a change in the frequency of the source occurs, the bridge circuit A is unbalanced and alternating current flows between the bridge terminals $c$ and $d$ through the primary winding of the transformer C and thereby impresses an alternating current signal on the input circuit of the amplifier unit D. The rebalancing signal is proportional in magnitude to said current and is one phase or of an opposing phase accordingly as the bridge unbalance is in one direction or in the opposite direction.

The electronic voltage and motor drive amplifier unit D is of the well known and widely used type disclosed and claimed in the Wills Patent 2,423,540 of July 8, 1947. As shown, said unit comprises voltage amplifying valves H, I and J, by which the input signal is successively amplified, a rectifier valve N which supplies unidirectional current to the anodes of the valves H, I and J, and comprises motor driving valves K and L and similar valves KA and LA in parallel therewith. The signal amplified by the valves H, I and J is impressed on the control grid of each of the valves K, L, KA and LA. The output circuits of the valves K and L and of the valves KA and LA are connected in parallel and form the output circuit of the electronic system, which energizes the control winding $e$ of the rebalancing motor E. The pair of valves KA and LA are duplicates of the pair of valves K and L, provided so that the failure of one or both valves of either pair will not interfere with the operation of the motor E by the other pair.

The power winding $ea$ is energized by alternating current supply conductors L' and L$^2$. The latter also supply current to the primary winding 15 of a transformer O. The latter has a secondary winding 16 supplying current to the anodes of the valves K and L, and has another secondary winding 18. The secondary winding 18 has a center tap connected to grounding conductor 20, and may have its ends connected to the terminal conductors B of the bridge circuit A, and thus serve as the source of the alternating current which has its frequency measured by said bridge circuit. The secondary winding 18 may also supply energizing current to the heating filaments of valves H, I, J, K, L, KA, LA and N. In the arrangement shown in Fig. 1, the transformer O is operated as a 60 cycle transformer, but preferably is structurally like a 25 cycle transformer, since the relatively greater core section of the 25 cycle transformer results in a lower leakage or stray magnetic flux, and a consequent reduction in the stray 60 cycle voltage induced in the system.

The secondary winding of the transformer C is connected in parallel with a condenser 19, and is shown as having one terminal connected to ground through the branched grounding conductor 20, through which numerous other ground connections are made. The second terminal of the transformer secondary winding is connected to the control grid of the valve H. The cathode of the valve H is connected to ground through a resistor 21. The cathode of the valve I is connected to ground through a biasing resistor 22 and a condenser 23 in parallel with said resistor. The cathode of the valve J is connected to ground through a resistor 24 and a condenser 25 in parallel therewith. Resistors 26, 27, and 28 are connected in series in the order stated between the anode of the valve H and the cathode of the rectifier valve N. The cathode of the valve N is connected to the anode of the valve I through the resistor 28 and a resistor 29, and is connected to the anode of the valve J through a resistor 30. The valve N, as shown, is a triode connected to operate as a diode, and has its anode connected to one terminal of a transformer secondary winding 17. The second terminal of the winding 17 is connected to ground, and is therefore connected to the cathode of the valve N through the plate circuits of the valves H, I and J, each of which has its cathode connected to ground.

The anode of the valve H is connected to ground through a condenser 31 which tends to eliminate harmonics of the fundamental 60 cycle frequency which are derived from the Wien bridge by bypassing the harmonics to ground. The junction point of the resistors 26 and 27 is connected to ground through a filter condenser 32. Similarly, the common junction point of the resistors 27, 28 and 29 is connected to ground by a second filter condenser 33. A third filter condenser 34 connects the junction of the resistors 28 and 30 to ground. The filter comprising the condensers 32, 33 and 34 and resistors connected thereto, smooths out ripple in the currents supplied to the anodes of the valves J, I and H. The filter means is desirably made effective to practically eliminate all ripple from the current supplied to the anode of the valve H, but need not effect an equally complete elimination of ripple from currents supplied to the anodes of the valves I and J, where a small ripple action is relatively unimportant.

The output circuit of the valve H is coupled to the input circuit of the valve I, and the output circuit of the valve I is connected to the input circuit of the valve J. The output circuit of the valve J is coupled to the input circuit of each of the valves K and L. The couplings are all of the capacity-resistance type including condensers 35, 36 and 37, respectively connected to ground by the resistors 38, 39 and 40. The ground connection to the condenser 35 also includes an isolation resistor 41. The control grid of the valve J is connected to the output circuit of the valve I between the condenser 36 and resistor 39. The control grid of the valve I is connected by a conductor 42 to a slider contact 42' which is adjustable along the resistor 38. The control grids of the valves K, L, KA and LA are connected to the portion of the output circuit of the valve J which connects the condenser 37 to the resistor 40.

The valves H and I are triodes enclosed in a common envelope or twin tube. The valves J and N are also triodes enclosed in a common envelope or twin tube. The valves K and L, as shown, are triodes enclosed in a common envelope or twin tube. In the apparatus shown, the valves H and I may form elements of one twin tube, and valves J and N may form a second twin tube, each of the commercially available 7F7 type, and the valves K and L may also form parts of a twin tube of the commercially available 7N7 type as is customary in the standard commercial form of the apparatus disclosed in said Wills patent.

The cathodes of the valves K, L, KA and LA are connected to ground through a cathode bias resistance 43. The anodes of the valves K, L, KA and LA are connected by conductors 44 and 45, respectively, to the left and right ends of the secondary winding 16 of the transformer O. A conductor 46 connects the center tap, or midpoint, of the secondary winding 16 to one terminal of the control winding $e$ of the motor E. The other terminal 47 of that winding is connected to ground. The first mentioned terminal of the winding $e$ is connected to ground by a condenser 48. The power winding $ea$ of the motor E has one terminal directly connected to the supply conductor L', and has its second terminal connected to the supply conductor $L^2$ by a condenser 49.

For its intended use, the motor E may well be of the form diagrammatically shown in the drawing, comprising control and power windings $e$ and $ea$ in which the currents flowing are of displaced phases, and which are arranged to create a rotating field for the rotor $eb$ which may have a squirrel cage winding. Each rebalancing signal impressed on the input circuit of the amplifier, as well as the resultant energizing voltage applied to the motor control winding $e$ is approximately in phase with, or is displaced 180° from the phase of the voltage between the supply conductors L' and $L^2$. Due to the action of the condenser 49, the current flowing through the power winding $ea$ is substantially in phase with the voltage of the alternating current supply conductors L' and $L^2$. The windings $e$ and $ea$ thus cooperate to establish a magnetic field revolving in one direction or in the opposite direction, depending on the direction of network unbalance.

In the normal operation of the apparatus shown, and disregarding the effect of signals not due to changes in the frequency of the current source connected to the bridge terminals B, when that frequency is a constant, the measuring apparatus is balanced. The position of the contact F along the rheostatic resistance 13 then forms a measure of the frequency and no rebalancing signal is then being impressed on the amplifier input circuit. When a change in the frequency of said current source occurs, the apparatus is unbalanced, and a rebalancing signal is impressed on the amplifier input circuit. The phase and magnitude of the rebalancing signal are dependent on the direction and extent of unbalance of the measuring circuit A. The amplifier rebalancing signal produces a current flow in the control winding $e$ of the motor E which combines with current flow through the power winding $ea$ to create a revolving magnetic field producing motor rotation in the direction to move the slider contact F toward the position in which it will rebalance the apparatus.

As balance is attained, the rebalancing signal fades away and the rotation of the rotor is interrupted, although stray currents and harmonic currents of a frequency which is a multiple of the frequency of the current supplied by the conductors L' and $L^2$, flow through the winding $e$ during periods in which no rebalance signal is existent. Further explanations with respect to the apparatus elements shown in the drawing and utilized in the normal measuring operation of the apparatus, appear unnecessary to a proper understanding of the invention disclosed and claimed herein, particularly as apparatus disclosed and claimed in the above mentioned Wills patent is in general use in this country.

As previously indicated, provisions are needed to minimize the amplifier blocking action of stray currents and harmonics. To that end, I have included in the amplifier circuit, a circuit element or device P of known type comprising a parallel-T, resistance-capacitance, frequency-selective network.

Such networks are discussed, for example, in some detail by Leonard Stanton, in the "Proceedings of the Institute of Radio Engineers," vol. 34, No. 7, July 1946, pages 447–456. Such a network is referred to commonly, and hereinafter, as a "parallel-T RC filter network." The parallel-T RC filter network of the device P forms a degenerative feedback connection between the anode and control grid of the valve I. The parallel-T RC network comprises condensers 50 and 51 which are connected in series with one another between terminal conductors 54 and 55, and are connected in parallel with resistors 52 and 53.

The latter are also connected in series with one another between the terminals 54 and 55. The connected terminals of the resistors 52 and 53 are connected to ground by a condenser 56 and conductor 57, and the connected terminals of the condensers 50 and 51 are connected to ground through a resistor 58 and the conductor 57. The terminal 54 connects the connected terminals of the condenser 51 and resistor 53 to the anode of the valve I. The terminal 55 connects the connected ends of the condenser 50 and resistor 52 to the control grid of the valve I through the condenser 35, the portion of the resistor 38 connecting condenser 35 to slider contact 42', and conductor 42.

The parallel-T RC filter network is tuned to attenuate 60 cycle signals of the fundamental frequency of the voltage across the supply conductors L' and L², assumed to be nominally 60 cycle per second signals, while passing signals of other frequencies including in particular the second and third harmonics of the fundamental frequency. In consequence, the filter network P operates to feed back from the plate circuit to the control grid of the valve I, all signals having frequencies other than 60 cycles, but does not feed back 60 cycle signals to any substantial extent. The cancellation of 120 cycle signals and stray signals of frequencies other than 60 cycle signals, eliminates the undesirable effects which would otherwise be produced by the signal components so eliminated.

For its isolation purpose, the resistor 41 may well have a resistance value of 250,000 ohms. For its purpose in attenuating 60 cycle signals while freely passing other signals, the network circuit elements may have impedance values approximately as follows: The condensers 50 and 51 each may have a capacity of 0.0025 microfarad; the condenser 56 may have a capacity of 0.005 microfarad; the resistors 52 and 53 may each have a resistance of 1.061 megohms; the resistor 58 may have a resistance of 0.531 megohm; and the coupling condenser 35 may have a capacity of 0.05 microfarad.

Suitable and suitably related values for the components of the impedance bridge circuit A when used to measure the frequencies, within the ranges 58–62 or 59–61 cycles of voltages of the order of 110–125 volts, are as follows:

| | |
|---|---|
| Resistor 1 _____ohms__ | 1800 |
| Resistor 2 _____do____ | 100 |
| Resistor 3 _____do____ | 1800 |
| Resistor 7 _____do____ | 22750 |
| Resistor 10 _____do____ | 250 |
| Resistor 11 _____do____ | 30 |
| Resistor 12 _____do____ | 150 |
| Resistor 13 _____do____ | 38 |
| Capacitor 6 _____mfd__ | 1.00 |
| Capacitor 9 _____mfd__ | 1.00 |

In further explanation of the invention, its operative characteristics and use, it is noted that one commercial instrument embodiment of the invention designed for the measuring of frequencies varying from 59 to 61 cycles per second at a voltage of 110 to 125 volts, is an instrument including a strip chart recorder, with a chart strip width of twelve inches and a scale width of eleven inches. The instrument scale is divided into one-hundred divisions. The recording pen can deflect from one chart side to the other in twenty-four seconds. The instrument includes a change gear chart drive which is adjustable to move the chart at speeds varying from one-half inch to twenty inches per hour. The instrument load on the supply line is 35 watts. The instrument develops a control signal in response to a frequency change as small as 0.01 cycle, and the calibrated accuracy of the measurements made by the instrument is plus or minus 0.025 cycle at normal frequency.

A second commercial instrument embodiment of the invention differs from the one just described in that it is designed for use for measuring and recording frequencies in the range of 58 to 62 cycles per second, and in that its scale is divided into eighty divisions.

A practically desirable characteristic of the invention is that the multi-stage amplifier and rebalancing motor are of the commercial type and form used in the well known potentiometric measuring instrument disclosed in Patent 2,423,540 which has been manufactured and sold on a large scale for a decade and has been found highly satisfactory from a practical standpoint. The multi-stage amplifying valves are capacitor coupled, and their couplings insure proper signal phase reversals by the different valves, and insure a desirably large decimation of the troublesome third harmonic of the measuring signal. The combined effects of the capacitor couplings and the parallel-T RC filter network keep unwanted currents in the amplifier desirably small and thus avoid overloading and contribute to the efficient performance of the amplifier.

In the uses of the Wien bridge for other purposes, it has been customary to connect the bridge input terminals, designated $a$ and $b$ herein, to a Wagner ground connection. Such a ground connection could be used with the bridge circuit A disclosed herein, but is made unnecessary in the circuit arrangement illustrated in which the bridge is energized by the transformer secondary winding 18 which has a center tap connection to ground. The winding 18 thus serves the purpose of the Wagner ground connection and has the practical advantage of requiring no calibrating adjustment, such as is required in connecting a Wagner ground connection to a Wien bridge circuit.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A frequency meter comprising a measuring circuit including an impedance bridge having two ratio arms each including a ratio resistance, a third arm including a capacitor and resistance in parallel therewith, and a fourth arm including a capacitor and resistance in series therewith, said bridge having rheostatic means comprising a contact cooperating with at least a portion of the last mentioned resistance and adapted, when adjusted relative to said portion, to adjust solely the resistance of the latter which is effectively included in said fourth arm, said bridge also having terminals for connecting a source of alternating current of a fundamental frequency to be measured between the ends of said ratio arms resistances which are respectively connected to the arms including said capacitors, and having two output terminals, one of which is connected to the ends of the ratio arms connected to one another, and the other of which is connected to the capacitor-including arms, an electronic voltage and motor drive amplifier having output terminals, and having input terminals connected to said bridge output terminals, a reversible, alternating current rebalancing motor comprising a control winding connected to the output terminals of said amplifier, a power winding adapted to be connected to a source of alternating current of the same fundamental frequency as the first mentioned source, and a rotor arranged for rotation in accordance with the output of said amplifier, said bridge being adapted, when unbalanced by a change in the fundamental frequency of the alternating current supplied thereto from the first mentioned source, to apply a bridge output signal to said input terminals which is operative to effect the energization of said motor for rotation of said rotor in a direction corresponding to the direction of bridge unbalance, and means constituting the sole mechanical coupling between said motor and said bridge and mechanically coupling said rotor solely to said rheostatic means and adapted to cause the rotation of said rotor to adjust relatively in said bridge solely said contact and said resistance portion, said motor being adapted in the presence of said bridge output signal to adjust relatively said contact and resistance portion in a direction and to an extent respectively dependent upon the direction and extent of bridge unbalance, thereby to effect the rebalancing of said bridge solely by the adjustment of said resistance effectively included in said fourth bridge arm, whereby the adjusted relative position of said contact and resistance portion is a measure of said fundamental frequency.

2. A frequency meter as specified in claim 1, in which said source of alternating current connected between the ends of said ratio resistance arms is a transformer secondary winding having its ends connected to the first mentioned bridge terminals and having a center tap adapted to be connected to ground.

3. A frequency meter as specified in claim 1, in which said amplifier includes a plurality of amplifying stages with an electronic valve having an anode, a cathode, and a control grid included in each stage, includes capacity coupling means connected between successive stages, and includes a parallel-T RC filter network connected between the control grid and anode of a valve included in an intermediate portion of said amplifier, said network being arranged to attenuate signals of said fundamental frequency and to degeneratively feed back to the last mentioned control grid signals not attenuated by said network, said network cooperating with said capacity coupling means to minimize the objectionable effects of harmonics of said fundamental frequency present in said alternating current.

References Cited in the file of this patent

UNITED STATES PATENTS

| Number | Name | Date |
|---|---|---|
| 2,431,501 | Phillips | Nov. 25, 1947 |
| 2,475,576 | Wild et al. | July 5, 1949 |
| 2,484,573 | Kezer | Oct. 11, 1949 |